3,133,054
PROCESSING OF HMX
Sam B. Wright and Glenn E. Sims, Kingsport, Tenn., assignors to Eastman Kodak Company, Rochester, N.Y., a corporation of New Jersey
No Drawing. Filed Mar. 7, 1962, Ser. No. 177,962
5 Claims. (Cl. 260—239)

This invention relates to the processing of crude HMX. More particularly it relates to a process for converting crude HMX to the beta-polymorphic form.

Wright et al. U.S. Patent 2,678,927 discloses that HMX, otherwise known as cyclotetramethylenetetranitramine or homocyclonite, prepared by the Bachmann process, which involves the nitrolysis of hexamine with nitric acid in an acetic acid medium, may exist in any one of several polymorphic forms. The same patent discloses that because of the relatively high sensitivity of the alpha, gamma and delta polymorphic modifications of HMX, it is highly desirable that the final product HMX exist in the less sensitive or beta-polymorphic modification. Picard U.S. Patent 2,983,725 discloses that the alpha form may be converted to the beta form by crystallization from a hot solvent solution such as acetone, acetonitrile or cyclohexanone. Such a method of converting $\alpha$-HMX to $\beta$-HMX requires separation of the $\alpha$-HMX product from its aqueous reaction medium (spent acid) prior to conversion to $\beta$-HMX. It has been our experience that the use of acetone or a like solvent, including cyclohexanone in the presence of the spent acid may sometimes result in the formation of undesirable polymers which may inhibit the recovery of the $\beta$-HMX in substantially pure form and recovery of the spent acid. It is therefore apparent that a method for converting $\alpha$-HMX to substantially pure $\beta$-HMX without the formation of undesirable by-products and without the requirement of a lengthy procedure for isolating $\alpha$-HMX in crystalline form is highly desirable.

It is therefore one object of the present invention to provide a process for converting crude HMX obtained by the nitrolysis of hexamine to the beta-polymorphic form. Another object is to provide a process for the crystallization of $\beta$-HMX from the aqueous reaction medium existing after its initial formation by the nitrolysis of hexamine. A further object is to provide a process for enhancing the removal of spent acid and any associated impurities present in the production of HMX from hexamine. A still further object is to provide a process for increasing the purity of HMX produced by the nitrolysis of hexamine with nitric acid in an acetic acid medium. Still another object is to provide a process for increasing the filterability of HMX resulting from the nitrolysis of hexamine. Other objects will appear hereinafter.

In the broader aspects of our invention we have found that crude HMX existing predominantly as the alpha-polymorph in the form of finely divided needles may be converted to the more readily filterable and more stable $\beta$-HMX form by dissolving the crude HMX, for example, in the form of an anhydrous acid/HMX slurry, in the spent acid remaining after the nitrolysis of hexamine, cooling the resulting mixture, adding additional slurry and continuing a heating and cooling cycle until substantially all of the $\alpha$-HMX is converted to the predominantly beta form. The mixture may be agitated during the process. Best results are obtained by dissolving about one part of the anhydrous acid/HMX slurry amounting to about 0.005 to about 0.06 parts of crude HMX in 5 to 6 parts of spent acid. It is important that the acid contain at least 78% acid, as acetic, preferably 80 to 82% acid. The temperature should be about 100° C. for optimum solution, which is followed by cooling the mixture to 30 to 50° C. We have found that from 3 to 6 parts of anhydrous acid/HMX slurry may be added to from 5 to 6 parts of spent acid provided the acid/HMX slurry is added in increments of about one part with a heating and cooling cycle after each addition, the heating being preferably to about 100° C. and the cooling from about 30 to 50° C. Digestion periods of from 15–30 minutes may be employed after any one of the incremental additions, preferably after at least the last addition of HMX/acid slurry. Although we do not wish to be bound by any particular theory as to how $\beta$-HMX results from this particular solution of anhydrous acid/HMX slurry in spent acid followed by a heating and cooling cycle after each incremental addition of slurry, it appears that this may be due to crystallization of $\beta$-HMX from the solution upon cooling, that is, from gradually more of the more soluble $\alpha$-HMX in the slurry becoming dissolved in the spent acid in each succeeding heating cycle, thus leaving the $\beta$-HMX as seed crystals in the batch. The critical acid concentration of approximately 78 to 82% may be maintained by adding sufficient water to the batch with each increment of slurry. According to our process one part of crude HMX is treated with 28 to 56 parts of about 80% spent acid by incremental additions of the crude HMX. Hydrolysis of any linear nitramine compounds which are present as a resutl of the nitrolysis of hexamine may be accomplished at the end of each heating cycle or at the end of the last heating cycle by holding the batch at about 98 to 100° C. for about 30 minutes.

The removal of spent acid from the acid/HMX slurry is considerably facilitated by using the above-described procedure of this invention for the following reasons.

(1) The size of the HMX crystals is in the range of 20 to 300 microns with a median diameter of approximately 150 microns. This increase in crystal size facilitates the decantation of a large amount of spent acid.

(2) The shape of the $\beta$-HMX crystals is bi-pyramid. Thus means of separation of the HMX from the spent acid by the use of liquid cyclone separators are provided. Liquid cyclone separator means have heretofore been of somewhat limited use due to the needle shape of the $\alpha$-HMX crystals.

By the process of this invention purification results from the removal of any RDX (also known as cyclotrimethylenetrinitramine or cyclonite) present because of the sodlubility of the RDX by-product in the spent acid. This is an additional advantage of our process for converting $\alpha$-HMX to $\beta$-HMX.

According to our process the $\beta$-HMX after build-up by the heating and cooling cycle may be collected by filtration. The filtration may be accompanied by decantation of the sepnt acid, some of which may be decanted during the above-described heating and cooling cycles, provided care is taken not to remove any of the $\beta$-HMX bi- pyramidal crystalline product. Filtration may also be accompanied by separation of a substantial amount of the spent acid by using cyclone separators. The $\beta$-HMX crystals may be washed with water prior to drying.

A further understanding of our invention will be had from a consideration of the following examples which are set forth to illustrate certain preferred embodiments.

Example 1

Add 500 ml. of spent acid (82% acid, as acetic) to a 1000 ml. beaker or other suitably sized container. Add 100 ml. of anhydrous acid/HMX slurry. Heat to 98 to 100° C. Hold at this temperature for 5 minutes. Cool to 30° C. at a rate of approximately 2° C. per minute. Repeat the heating and cooling cycle 2 times. Filter the product. Results:

HMX polymorph—beta
Crystal size—40 to 200 micron

Example 2

Add 5.5 liters spent acid (80% acid, as acetic) and 235 ml. water to a 10 liter still pot. Add 1 liter of anhydrous acid/HMX slurry. Set agitation to desired speed and heat to 100° C. Cool to 50° C. Add 1 liter of anhydrous acid/slurry and 235 ml. water to the batch and heat to 100° C. Cool to 50° C. and add 1 liter of anhydrous acid/HMX slurry and 235 ml. water to the batch. Heat to 100° C. Digest for 30 minutes at 98 to 100° C. Cool to 50° C. Heat to 100° C., cool to 40° C. Heat to 80° C. and cool to 40° C. Stop agitator and allow HMX to settle for 10 minutes. Decant approximately 6.5 liters of spent acid. Filter the remaining acid/HMX slurry through a fritted glass crucible, coarse porosity. Dry the product and analyze. The following results were obtained:

Filtration rate (spent acid)—1330 ml./min.
HMX polymorph—beta
Crystal acidity, percent—1.09
Impact sensitivity, cm.—33.4 [using Bureau of Mines type 5 tool impact device with 5 kilogram weight]
HMX, percent—98.4

Particle size distribution:
| U.S. Sieve Series No.— | Percent passing, by weight |
|---|---|
| 50 | 97.7 |
| 100 | 38.7 |
| 200 | 6.3 |
| 325 | 2.4 |

*Example 3*

The procedure of Example 2 was followed except that the additions of anhydrous acid/HMX slurry were made in six increments rather than three increments.

Results: Beta HMX ranging from 16 to 180 micron with very good filtration.

*Example 4*

In the procedure described in Example 2, a digestion period of 15 minutes after each addition of anhydrous acid/HMX slurry was made rather than the 30 minute period after the third addition. The following results were obtained:

Filtration rate (spent acid), ml./min.—1840
HMX polymorph—beta
Crystal acidity, percent—1.44
Impact sensitivity, cm.—38.7 [using Bureau of Mines type 5 tool impact device with 5 kilogram weight]
HMX, percent—99.6

Particle size distribution:
| U.S. Sieve Series No.— | Percent passing, by weight |
|---|---|
| 50 | 94.0 |
| 100 | 33.0 |
| 200 | 9.0 |
| 325 | 3.0 |

*Example 5*

In the procedure described under Example 2, the digestion period at 100° C. was changed. After the first and second additions, the batch was heated to 100° C. and digested 5 minutes. After the third addition, the batch was held at 100° C. for 30 minutes. The heating and cooling cycles remained the same.

HMX polymorph—beta
Crystal acidity, percent—0.68
Impact sensitivity, cm.—45.0 [Bureau of Mines type 5 tool impact device using 5 kilogram weight]
HMX, percent 99.2
Filtration rate (spent acid), ml./min.—2667

Particle size distribution:
| U.S. Sieve Series No.— | Percent passing, by weight |
|---|---|
| 50 | 91.4 |
| 100 | 37.9 |
| 200 | 4.5 |
| 325 | 2.0 |

In the above examples the existence of the beta-polymorph of HMX was determined by microscopic analysis of the crystals.

It may be readily observed from the preceding examples that we have provided a method for conversion of α-HMX to β-HMX whereby not only is the necessity of isolating α-HMX crystals prior to the conversion and recovery of β-HMX eliminated, but also is the filterability of the anhydrous acid/HMX slurry resulting from the nitrolysis of hexamine improved and the separation of any RDX by-product enhanced.

Although the invention has been described in considerable detail with particular reference to certain preferred embodiments thereof, variations and modifications can be effected within the spirit and scope of the invention as described hereinabove, and as defined in the appended claims.

We claim:
1. A process for preparation of β-HMX which comprises
   (1) dissolving crude HMX existing predominantly as the alpha-polymorph in the form of finely divided needles as an anhydrous acetic acid/HMX slurry in the spent acid remaining after nitrolysis of hexamine,
   (2) cooling the resulting mixture and
   (3) adding additional amounts of said slurry during a continuing heating and cooling cycle until substantially crystallization of substantially pure crystalline bi-pyramidal β-HMX.

2. In a process of preparing HMX comprising nitrolysis of hexamine with nitric acid in an acetic acid medium and separating HMX from the other products of the nitrolysis, the improvement which comprises dissolving the anhydrous reaction medium existing after initial formation of HMX by nitrolysis of hexamine, said anhydrous reaction medium comprising about one part of anhydrous acid/HMX slurry containing about 0.05 to about 0.06 part of crude HMX, in about 5 to 6 parts of 78 to 82% spent acetic acid collected after said nitrolysis, heating the resulting mixture to a temperature of about 100° C., cooling the mixture to about 30 to 50° C., repeating the heating and cooling to substantially these same temperatures with mixing until substantially complete conversion to β-HMX, and collecting the resulting bi-pyramidal crystals of β-HMX.

3. The improvement according to claim 2 wherein an additional amount of anhydrous acid/HMX slurry is added in increments during the cooling to the lower 30 to 50° C. temperature portion of the repeated heating and cooling, the ratio of total amount of crude HMX, including both that present in the original anhydrous/HMX slurry and in the increments, to amount of spent acid, being 1 part of crude HMX to about 60 parts spent acid.

4. A process for the polymorphic conversion of α-HMX to β-HMX which comprises in consecutive order
   (1) adding about 5½ liters of spent acid resulting from the nitrolysis of hexamine in an acetic acid medium and containing about 80% acid as acetic and about 250 ml. of water to a 10-liter still pot,
   (2) adding about 1 liter of anhydrous acid/HMX slurry resulting from the nitrolysis of hexamine in an acetic acid medium,
   (3) heating the resulting mixture to about 100° C.,
   (4) cooling said mixture to about 50°,
   (5) adding about 1 liter of further increment of said anhydrous acid/HMX slurry and about 250 ml. more of water to the mixture,
   (6) heating the mixture to 100° C. and digesting same for about 30 minutes at about 98 to 100° C.,
   (7) cooling the mixture to about 50° C.,
   (8) heating the mixture to about 100° C.,
   (9) cooling the mixture to about 40° C.,
   (10) heating the mixture to about 80° C., all of said heating and cooling being accompanied by agitation of the mixture,

(11) settling the HMX for about 10 minutes,
(12) decanting about 6½ liters of the supernatant liquid.
(13) filtering the remaining acid/HMX slurry through a fritted glass crucible of coarse porosity, and
(14) drying the product left behind upon said filtering, said product comprising β-HMX having a crystal acidity of less than about 1.1%, an impact sensitivity of about 30–40 cm. (on a Bureau of Mines type 5 tool impact device using a 5 kilogram weight), a purity of at least about 98% HMX, and a particle size such that at least about 90% by weight of the particles pass a U.S. Sieve Series No. 50.

5. A process for the production of β-HMX which comprises dissolving anhydrous acid/HMX slurry in an acid medium containing approximately 80% acid as acetic at about 100° C., cooling the resulting mixture to from about 30–50° C. with the addition of further anhydrous acid/HMX slurry, continuing alternate heating to 100° C. and cooling to 30–50° C. with the addition of further anhydrous acid until substantially all of the HMX exists as beta-polymorphic bi-pyramidal crystals, and collecting said beta-polymorphic bi-pyramidal crystals, the total amount of anhydrous acid/HMX slurry used being from 3 to 6 parts and the total amount of spent acid used being from 5 to 6 parts, said addition of further anhydrous acid/HMX slurry being accomplished in increments of 1 part with a heating and cooling cycle after each addition and the mixture being held at 98–100° C. for about 30 minutes after at least one heating and cooling cycle thereby promoting hydrolysis of linear nitramine compounds.

No references cited.